Fig. 1.

E. J. VON PEIN.
CASH REGISTER.
APPLICATION FILED SEPT. 16, 1910.

1,073,704.

Patented Sept. 23, 1913.

WITNESSES:

INVENTOR

ATTORNEYS

E. J. VON PEIN.
CASH REGISTER.
APPLICATION FILED SEPT. 16, 1910.

1,073,704.

Patented Sept. 23, 1913.
12 SHEETS—SHEET 9.

Fig. 11.

WITNESSES:

INVENTOR
Edward J. Von Pein
BY
ATTORNEYS

E. J. VON PEIN.
CASH REGISTER.
APPLICATION FILED SEPT. 16, 1910.

1,073,704.

Patented Sept. 23, 1913.
12 SHEETS—SHEET 12.

UNITED STATES PATENT OFFICE.

EDWARD J. VON PEIN, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,073,704.   Specification of Letters Patent.   Patented Sept. 23, 1913.

Application filed September 16, 1910. Serial No. 582,312.

*To all whom it may concern:*

Be it known that I, EDWARD J. VON PEIN, a citizen of the United States, residing at Dayton, in the county of Montgomery and State of Ohio, have invented certain new and useful Improvements in Cash-Registers, of which I declare the following to be a full, clear, and exact description.

This invention relates to cash registers, and has among its objects to provide improved means for transmitting power to such machines.

Cash registers driven by electric motors are known in the art, but many of such motor driven machines employ some type of clutching mechanism to connect the motor to the main operating mechanism of the machine, with the object of preventing strain to the machine parts as such parts reach their normal or "home" position. The present construction employs a gear connection including an intermediate element which may be obstructed by brake mechanism, such as a ratchet, the embodiment shown. In this construction the intermediate element is a planetary gear which is free normally to revolve around its central gear, but which when its revolution is obstructed, may transmit power to the machine parts.

Another object of the invention is to provide an improved check delivering apparatus by which checks are delivered on edge extending upward and convenient to the operator or customer.

Another object of the invention is to provide a cash drawer opening mechanism which is supplied with power by the main operating mechanism of the machine rather than by manually applied power upon closing the cash drawer. By this arrangement in motor driven machines less manually applied power is required.

Another object of the invention is to provide an indicator screen mechanism operating to cover the indicator screens partly only when the totalizer selecting device is operated and to cover the indicators completely during the operation of the main driving mechanism of the machine, the latter being a usual condition. The purpose of thus partly covering the indicators is not to destroy an indication by the mere operation of the selecting device, while guarding against fraudulent operation of the machine. For example, flashes have been constructed to move to covering position whenever the selecting device is adjusted, for the purpose of making such fact known, as it was possible without such an arrangement for an operator to cause the amount of the sale to be added to another operator's totalizer and then quickly to adjust the selecting device to his own position exposing his own initial and thereby escape detection in such fraudulent operation. The present arrangement while serving to make known an unnecessary or improper operation of the selecting device still permits viewing all the indicators including the initial indicator. This is a preferable arrangement in that it enables operators to set the selecting devices as guided by the indicator.

A further object of the invention is to provide an indicator which is controlled by a second indicator in such manner that the first indicator may be moved to indicating position only after movement to a predetermined extent by the second indicator. As shown the construction is designed to cause movement of a higher value indicator, for tens of shillings in the particular embodiment disclosed, when a lower value indicator, viz., units of shillings, has been given ten increments of movement from its normal or zero position. By such a construction a separate differential mechanism for adjusting the first or higher value indicator is not needed.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings.

In the drawings the present improvements are shown applied to a machine of the type shown in the patents to Cleal and Reinhard No. 580,378 granted April 13, 1897, Carroll No. 754049, granted March 8, 1904. These patents describe a cash register having a plurality of oscillating segment gears which are controlled differentially in their movement by a plurality of depressible value keys and serve to set indicators, actuate totalizing devices, and to set type wheels in the printing mechanism. A number of totalizers are mounted on a reel and an adjustable lever is provided for rotating the reel to bring any one of the reel totalizers into coöperative relation with the actuating mechanism. The patent to Von Pein No. 938,527 granted Nov. 2, 1909, may be here referred to also.

The printing mechanism is arranged to print records of transactions on a strip of paper contained in the machine, and on checks which are issued by the machine. As before stated, one of the present improvements is a device for taking checks away from the printing mechanism and delivering them to an operator or customer as desired. In the drawings this check delivering mechanism is shown arranged for delivering checks at the operator's side of the machine, but it may be reversed for delivering checks at the rear of the machine convenient to customers.

The connections between the motor and the driving mechanism in the present instance differ from what has been employed in the prior art in that a planetary transmission device is substituted for a clutch mechanism.

The machine shown is adapted for British currency but this is merely by way of illustration and it may readily be employed for currency of other systems.

Figure 1:
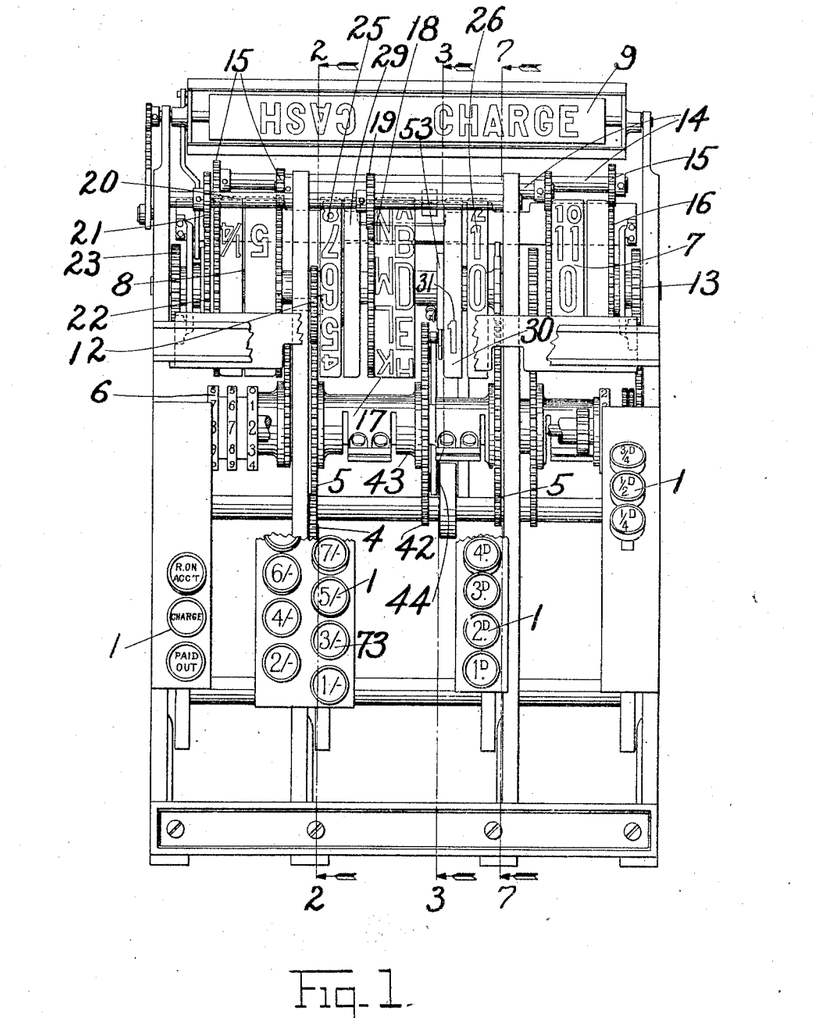
Figure 1 is a front elevation of a cash register embodying the invention but with the multiple totalizers which are usually at the left of the machine and the printing mechanism which is usually at the right or the machine, and the cabinet omitted.
Figure 2:
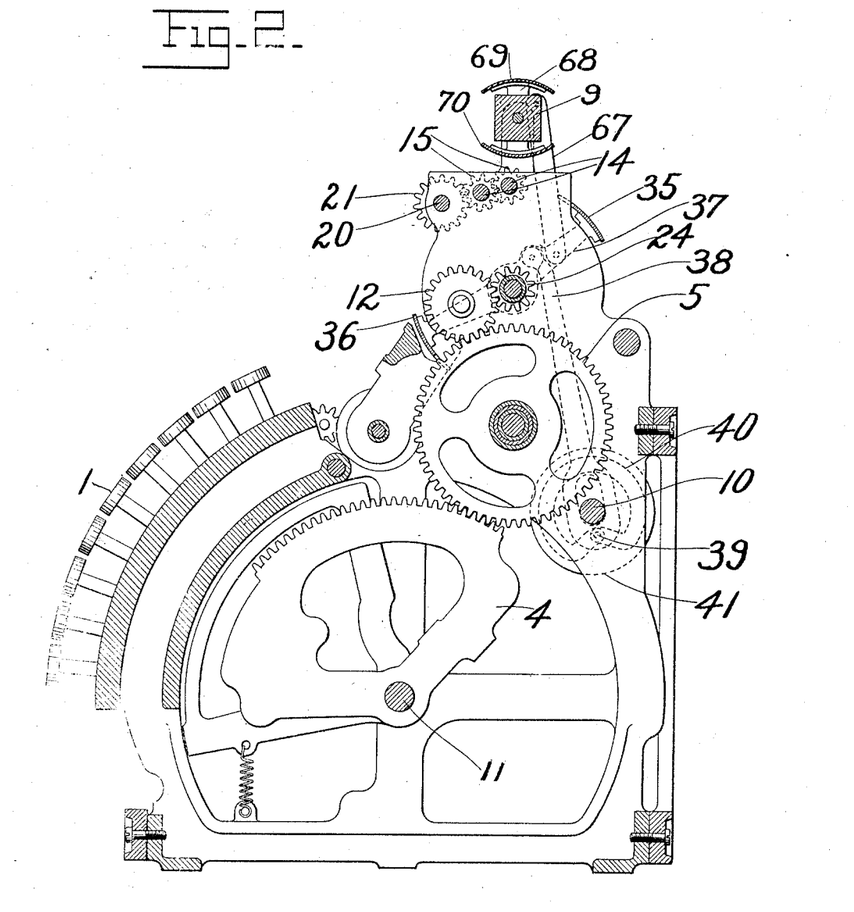
Fig. 2 is a transverse vertical section taken on the line 2—2 of Fig. 1.

Referring to the drawings, the drive shaft 10 of the machine is caused to make one rotation upon each operation. It is suitably connected by cranks and a pitman (not shown in the drawings) to a shaft 11 (Fig. 3) causing this shaft to oscillate forwardly and backwardly an invariable extent at each operation of the machine. The shaft 11 carries segments 3 and the patents previously specified describe how these segments are latched to and unlatched from segment gears 4 for the purpose of causing the segment gears to be oscillated different extents upon the operation of the machine as determined by the particular value keys which are depressed. Each segment gear 4 meshes with an intermediate gear 5 (Fig. 2) and through this gear transmits its differential movements to the main or cash totalizer 6 (Figs. 1 and 6) and also to the indicators 7, 8, and 9 (Fig. 1). Each intermediate gear, with the exception of the intermediate gear 12, which is controlled in its movement by the shillings bank, meshes with a pinion 13 fast to one of the indicator drums 7 or 8. The indicators 7 and 8 are double the number of the intermediate gears 5 each indicator 7 being geared to its companion indicator 8 of the same denominational order, by shafts 14, pinions 15, carried by shafts 14, and gears 16 fixed to the indicator drum, thus furnishing a usual "front and back" indicator.

A single indicator 17 serves for the clerks' initials and accordingly is provided with two sets of characters. This indicator carries a gear 18 which meshes with a pinion 19 fixed to a shaft 20 which also carries a pinion 21 meshing with an intermediate gear 22 rigid with a pinion 23 which in turn meshes with an intermediate gear, not shown, controlled in its movement by a reel totalizer selecting lever 74.

*Indicator screen.*—It is customary in devices of this type to provide screens preventing the indicators from being viewed while they are being set, and thus tending to compel the completion of operation of the machine. It has also been proposed to provide a screen construction wherein the screen could move to concealing position immediately on the operation of some selecting device of the machine. This latter construction has the defect that the operator may mis-operate the machine intentionally and then by a quick depression of the selecting device cause the screen to move to a position concealing the indicators and thus tending to conceal his manipulation of the machine. The present construction provides an improved screening mechanism whereby when the selecting device is operated the screen will move partially to concealing position, thus indicating by its partial movement that the selecting device has been operated and yet permitting the indicators to be viewed.

Figure 8:
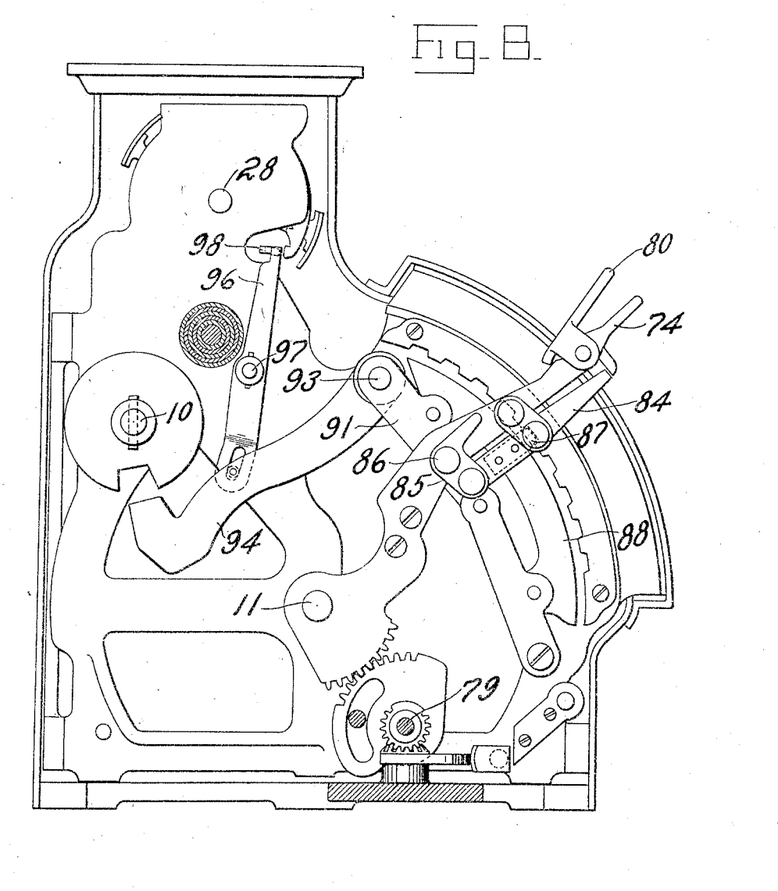
Fig. 8 is a left side elevation of the machine but with the multiple totalizers omitted.

In the present machine the selecting mechanism is shown in Fig. 8, and comprises a manually adjustable lever 74 loosely journaled on shaft 11 and connected through gearing to a shaft 79, as shown, which shaft serves to position certain totalizers for operation as is fully described in the patents referred to. Mounted on this lever 74 is a thumb grip 80 adapted to depress a plunger 84 carrying a lug or projection 87. This projection engages and moves a segment 88 pivoted on two arms, the upper one 91 of which is itself pivoted on a pin 93 and has fast thereto a rearwardly extending arm 94. Connected by a pin and slot connection to this arm 94 is a latch controlling lever 96. This much of the construction is found on the prior machine.

Figures 6, 7:
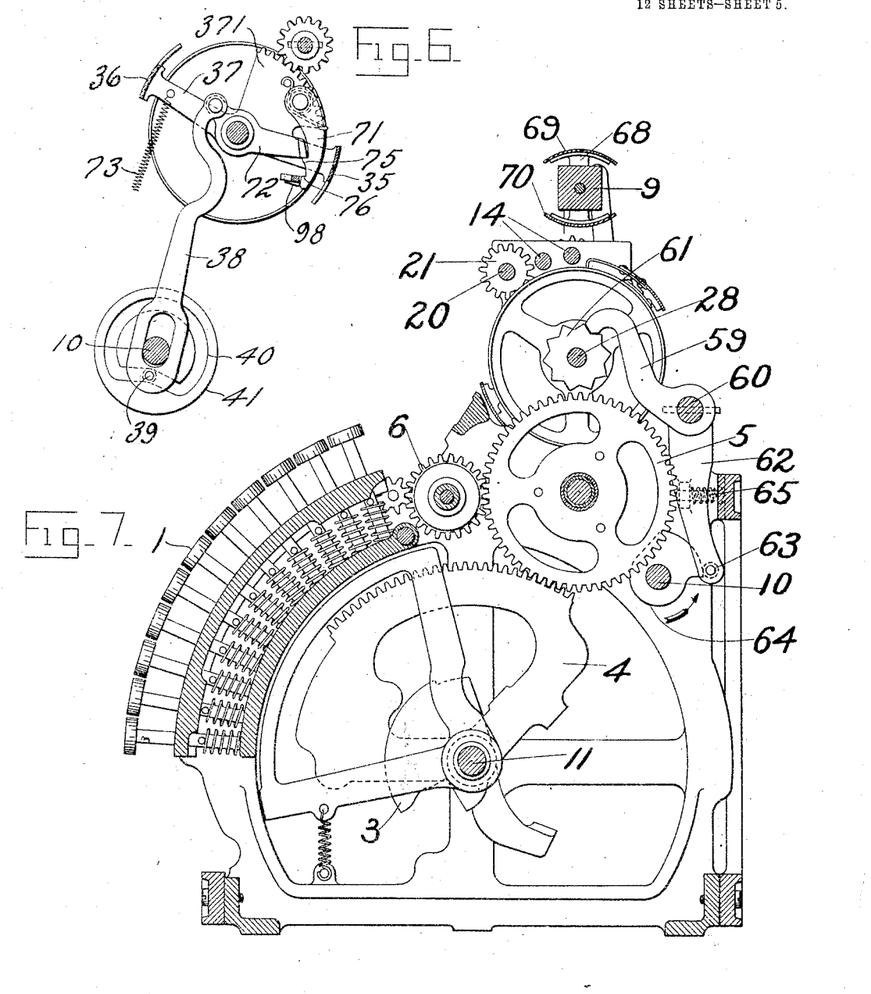
Fig. 6 is a detail of indicator screen mechanism.
Fig. 7 is a transverse vertical section of the machine taken on a line 7—7 of Fig. 1.

Turning now to Fig. 6 it will be seen that the screens 35 and 36 are carried on an arm 37 and are normally drawn to concealing position by a spring 73. The main shaft 10 is provided with a cam 41, in the groove 40 of which rides an anti-friction roller 39 on a pitman 38, this pitman being fastened to a driving arm 72. Fast to the screen arm 37 is a segment 371 and on this segment is pivoted a latch 71 having projections 75 and 76, and in the normal position of the parts the projection 75 engages a flange on the driving arm 72 thereby preventing movement of the screen. When the selecting mechanism of Fig. 8 is actuated the upper end of lever 96 moves forwardly and a flange 98 thereon will engage the latch 71 and release it from the arm 72, whereupon the spring 73 will rock the screen in an anti-clockwise direction until the lower projection 76 engages the flange on arm 72. Thus it will be seen that the movement of the selecting lever causes the partial movement of the screen toward concealing position, thus indicating that the lever 74 has been moved. When the machine is operated and shaft 10 rotated the pitman 38 is depressed thus permitting the movement of the screen completely to concealing position and the movement of the pitman is of great enough extent to cause the flange on arm 72 to pass above and engage the upper projection 75 on latch 71. During the latter part of the operation, the pitman 38 rises again thus forcing the screen back to the exhibiting position of Fig. 6 and again tensioning spring 73.

*Indicator mechanism.*—The indicating mechanism of the machine except that employed in connection with the shillings bank of keys, is of the usual construction and therefore need not be described. This bank of shillings keys, however, includes 19 keys and the full stroke of segment 4 is therefore divided into 19 units. As in the other cases the intermediate 5 meshes with the segment 4 for this bank but the intermediate also meshes with the pinion 12, shown in Fig. 2, this meshing in turn with a pinion 24 of half its size. The latter pinion 24 is fastened rigidly to the units of shilling indicator whereby the angular movement of said indicator 25 is twice as great as the angular movement of any of the other indicators for an equal extent of movement of the respective segment gears 4. Therefore the full extent of movement of the shillings segment 4 will rotate the indicator 25 nineteen units or one unit less than two rotations.

Figure 3:
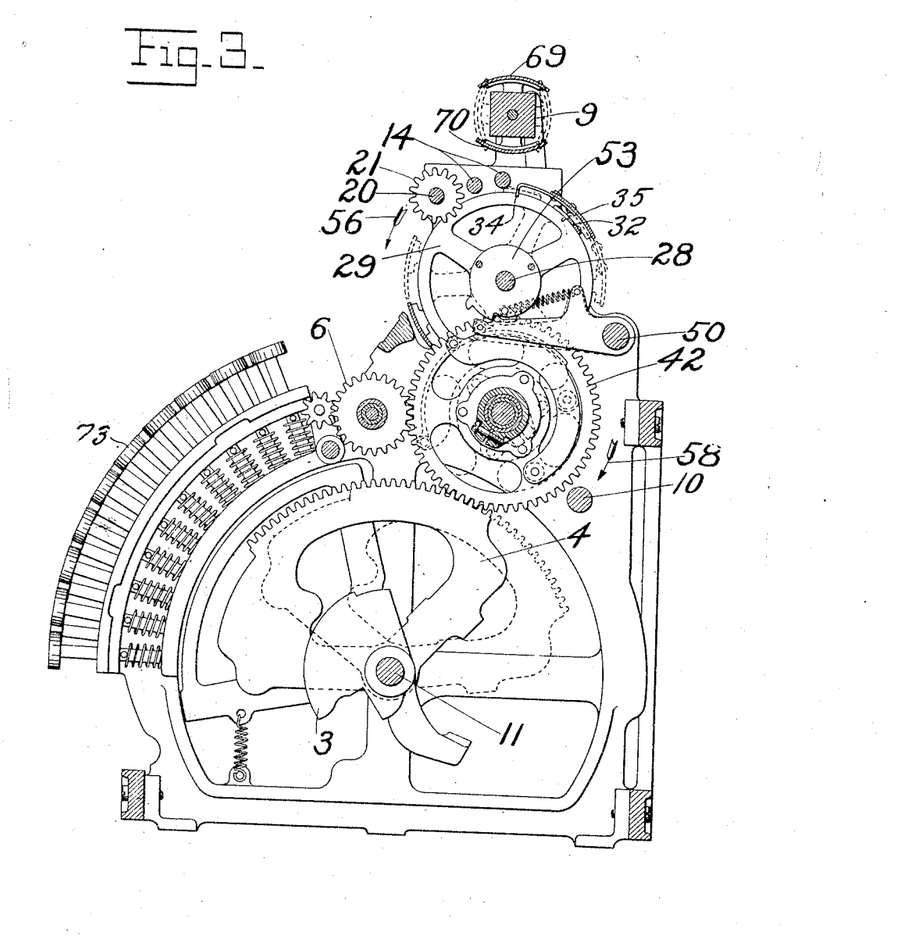
Fig. 3 is a transverse vertical section taken on the line 3—3 of Fig. 1.
Figure 4:
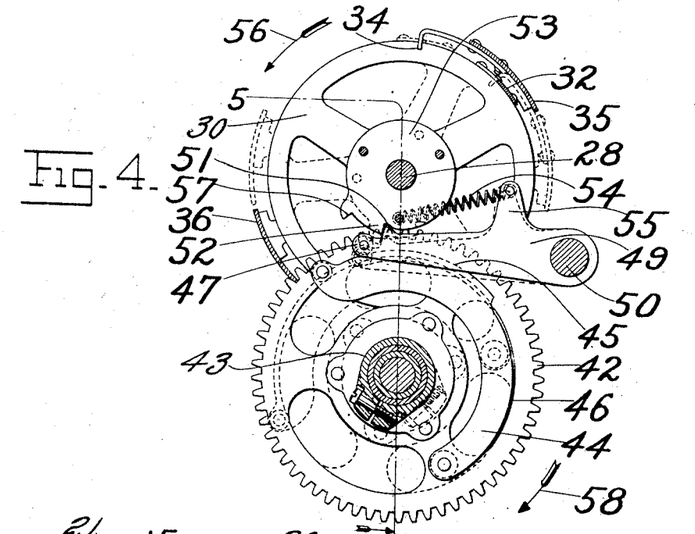
Fig. 4 is an enlarged detail of the indicator mechanism also shown in Fig. 3.
Figure 5:
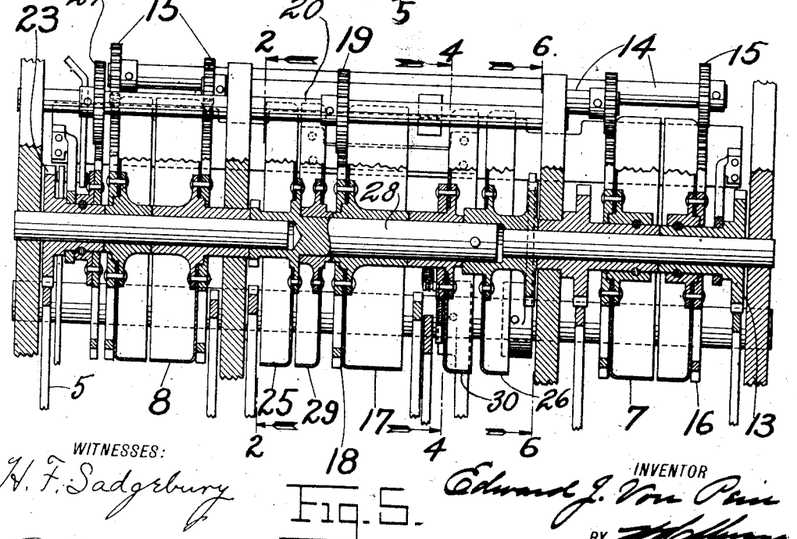
Fig. 5 is a longitudinal vertical section of the indicator mechanism taken on the line 5—5 of Fig. 4.

The indicator 25 indicates toward the front of the machine and a companion indicator 26 indicates toward the rear of the machine, these two indicators being both fast on shaft 28 so as to move together. The tens of shillings indicators 29 and 30 are connected together by a plate 32 and are loosely journaled on the shaft 28. They have no direct connection with the segments 4 but are instead driven one unit of movement when the units of shillings indicators 25 and 26 are given one complete rotation or more. To provide this one unit movement the tens of shillings indicators are constructed to be spring driven toward indicating position under control of the unit shillings indicators and to be restored to normal or non-exhibiting position by the screen mechanism previously described. Referring now to Figs. 3 and 4 it will be seen that the intermediate gear 5 of the shillings bank has fast thereto a companion gear 42 connected to it by a sleeve or hub 43. This gear 42 carries a curved plate 44 upon its side extending about 180 degrees of its circumference and having two curved surfaces 45 and 46 at different distances from the center of the gear and of substantially equal annular length. An arm 49 is carried loosely on a rod 50 and is provided with a roller 47 positioned to ride on the outer edge of the arm 44. Connected to an upward extension 55 of this arm 49 is a spring 54 the other end of which is fast to a disk 53 secured to the tens of shillings indicator. This disk 53 is provided with two shoulders 52 and 57 and a projection 51 of arm 49 normally engages projection 52 as shown.

It will readily be seen that a movement of the intermediate gear 5, less than sufficient to carry the curved edge 45 away from roller 47, will not permit any movement of the arm 49, but that if the edge 46 of plate 44 passes under the roller 47 the spring 54 may then rock the arm 49 thus carrying the projection 51 on said arm away from the projection 52 on disk 53 and thus leaving the tens of shilling indicator free to move one step or until the other projection 57 on said disk engages the projection 51. The control by the screen of this tens of shillings indicator and the return of said indicator by the screen remain to be explained. In Fig. 4 the screen is shown in full lines in its normal position and in dotted lines in its concealing position, and the screen 35 is provided with the projection 34 extending across the path of the plate 32 which connects the two tens of shilling indicators. Thus it will be seen that when the screen is moved from the full line to the dotted line position it will engage the plate 32 if the tens of shilling indicator has been moved from normal position and restore it to normal position at the same time preventing it from being viewed. Near the end of the operation of the machine the screen again rises and if, at this time the arm 49 has been lowered the tens of shilling indicator may move with the screen and bring its numeral to exhibiting position. At the beginning of the next operation the screen will restore the tens of shillings indicator to its normal or zero position wherein it will be latched by the arm 49.

Figure 9:
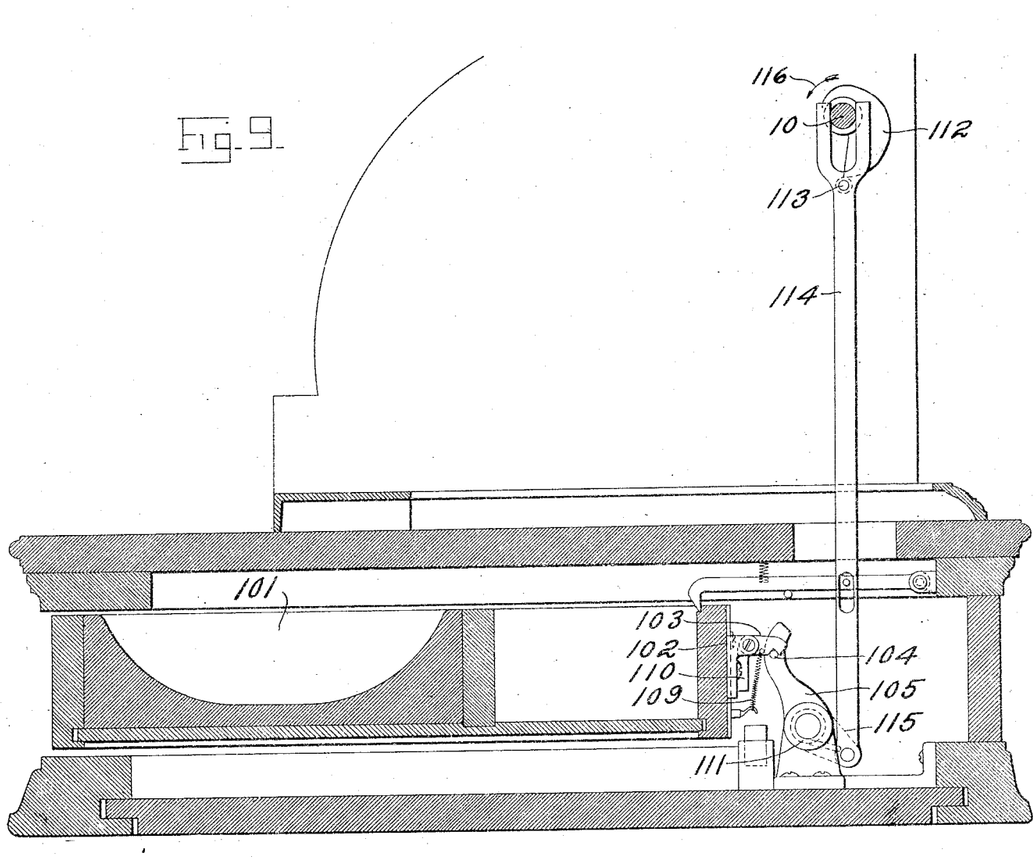
Fig. 9 is a detail in transverse vertical section showing the cash drawer and its operating mechanism.
Figure 10:
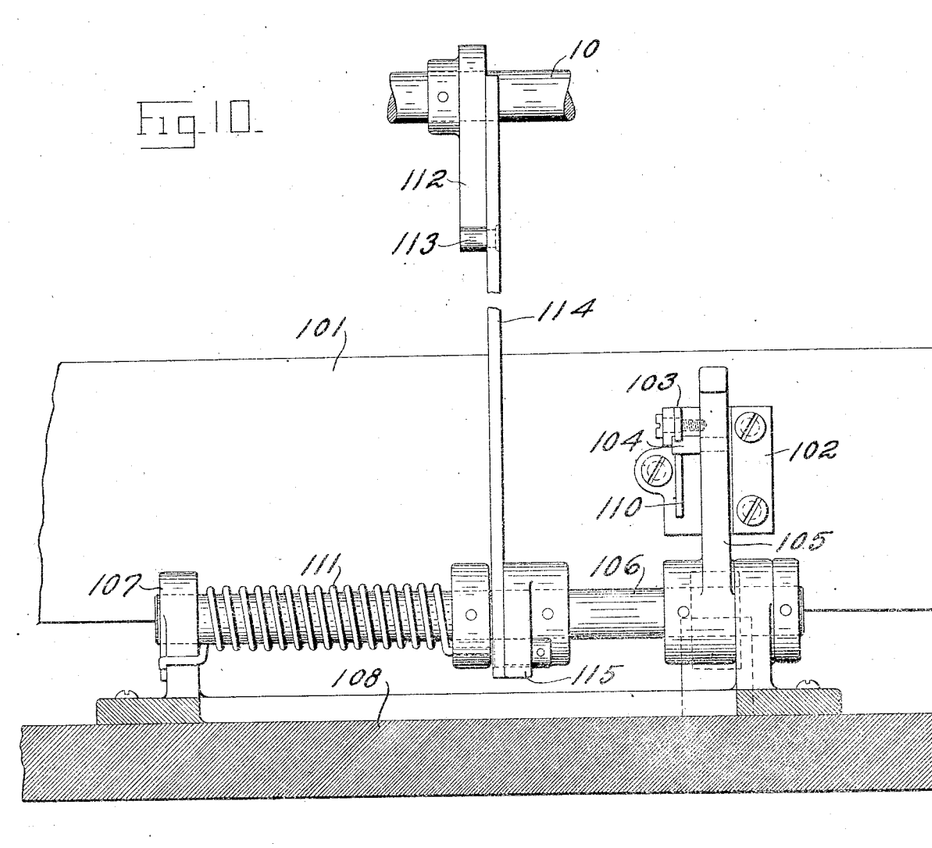
Fig. 10 is a rear elevation of the cash drawer operating mechanism shown in Fig. 9.

*Cash drawer operating mechanism.*—The cash drawer 101 (Figs. 9 and 10) is provided with a bracket 102 on its rear wall, on which is pivoted a drawer retaining pawl 103 co-acting with a pin 104 on an arm 105 fast to a shaft 106 journaled in suitable bearings 107 fastened to the base plate 108 of the machine. A spring 109 normally holds the pawl in the position shown in Fig. 9, the pawl being prevented from rocking farther downwardly than this position by a downward extension 110 of the pawl. The arm 105 is arranged to be rocked forwardly into engagement with bracket 102 at a certain period of the operation of the machine for the purpose of driving the drawer to its open position. The shaft to which the arm 105 is secured is provided with a coil spring 111 for urging the shaft to rock so that arm 105 will be carried forwardly as desired, but the spring is normally prevented from such action by a cam 112 fast to the main drive shaft 10 and co-acting with a roller 113 on a pitman 114 which at its upper end is slidably forked over shaft 10 and at its lower end is pivoted to an arm 115 rigidly secured to the shaft 106. The drive shaft 10 rotates in the direction indicated by arrow 116 (Fig. 9) and consequently will carry cam 112 out of engagement with roller 113 at the beginning of its rotation, and at the end of its rotation the cam will gradually return pitman 114 to its normal position consequently tensioning the spring 111 ready for another operation of the machine. The cash drawer is moved to its inner position by hand but not against spring action as is usually the case. The absence of spring pressure on the drawer when in its inner position permits the pawl to retain the drawer in its inner position while being so shaped as to permit the drawer to be manually drawn to its open position.

Figure 11:
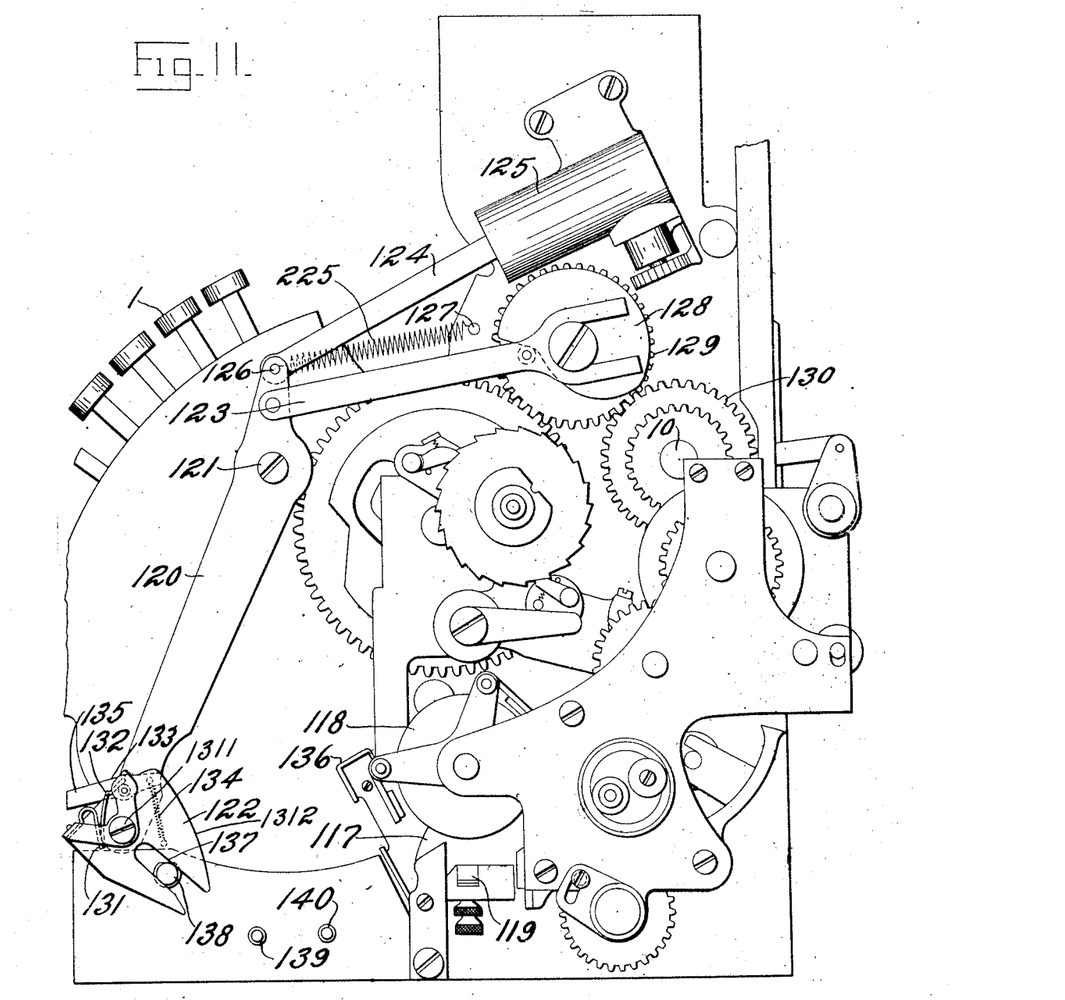
Fig. 11 is a right side elevation of the machine showing the printing mechanism and a check delivering device.

*Check delivering mechanism.*—As a complete description of the printing mechanism is to be found in the patent to Carroll, mentioned above, it will not be here repeated, it being thought that all that is necessary to state in regard to it in the present application is that the check paper is fed out of the printing mechanism at the point 117 (Fig. 11) between type carriers 118 and a platen and a shearing device 119. The novel check delivering device comprises a lever 120 pivoted to the machine frame on a pin 121 and having pivoted at its lower end a check gripping device 122. Above its pivot the lever is pivotally connected to an actuating pitman 123 and also to a piston 124 of a dash pot 125 for regulating the speed of return movement of the lever 120 after having been actuated by the pitman 123. The return movement of the lever 120 to its outer position as shown in Fig. 11, is accomplished by a spring 225 extending between a pin 126 on the lever and a pin 127 fast to the side frame of the machine. The pitman 123 is caused to rock the lever 120 in the opposite direction by a cam 128 secured to a gear 129 meshing with a gear 130 fast to drive shaft 10. The gripping device 122 has mounted thereon a pair of spring clips 131 and 132 normally in contact with each other, but which may be separated by rocking an arm 133 to which the clip 132 is secured. A spring 134 serves normally to hold the clips in contact. As stated the gripping device is pivoted to lever 120 on a pin 1311 and is adapted as the lever 120 moves rearward to rotate until the clips 131 and 132 are at the rear of the gripping device and in position to engage a check at the opening 117. To cause such rotation a slot 137 is provided in the gripping device and rollers 138, 139 and 140 are mounted on the machine frame, the roller 138 being normally in the slot 137 as shown. When the lever 120 moves rearward the gripping device rocks around and slides on roller 138 and the curved edge 1312 finally engages and rides over rollers 139 and 140 thus preventing further rotation of the gripping device. At the rearmost position arm 135 engages stationary projection 136 and separates clip 132 from clip 131, so that the check may enter between the clips. As the lever 120 moves forwardly the clips come together again and carry the check between them, and as the gripping device rotates around its pivot 1311 the check is finally placed in a substantially upright position convenient to the operator's hand.

Figure 12:
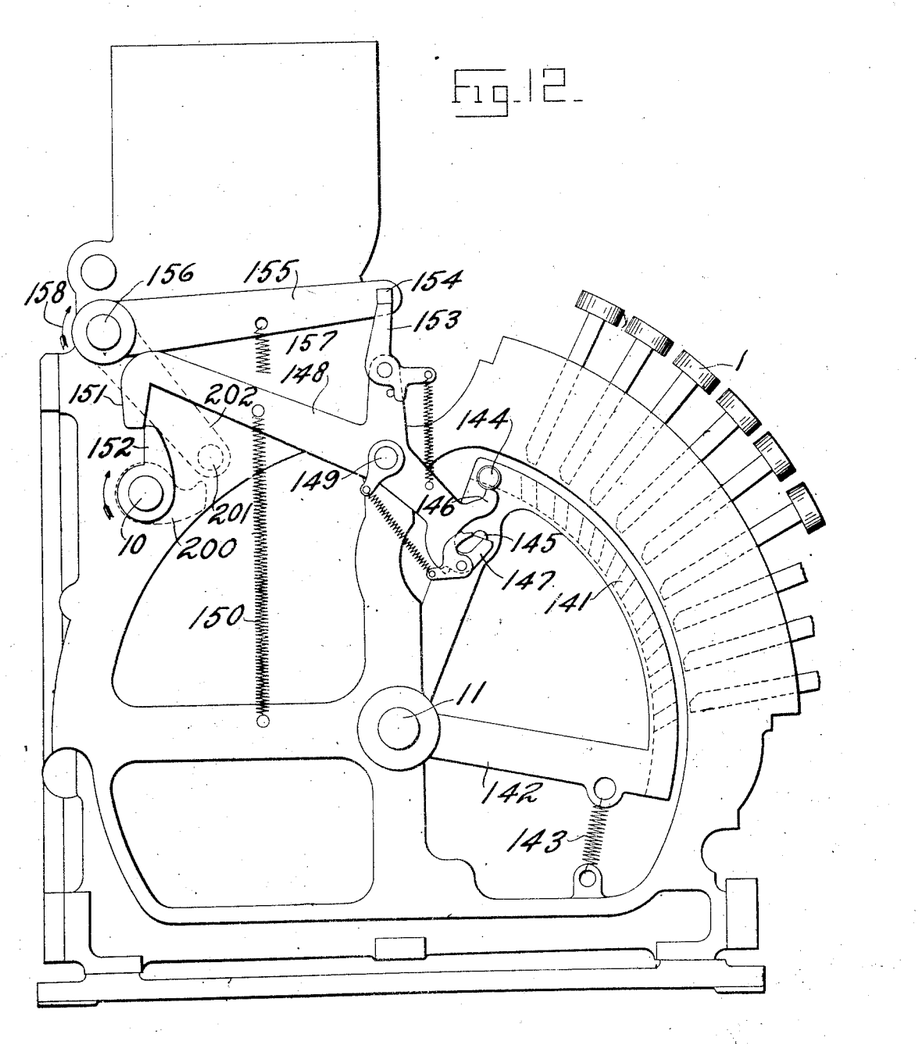
Fig. 12 is a transverse vertical section of the machine taken at the left of the bank of transaction keys and shows the mechanism controlled by these keys for closing the motor switch and moving a stop into the path of an element of the planetary gear transmission device.
Figure 13:
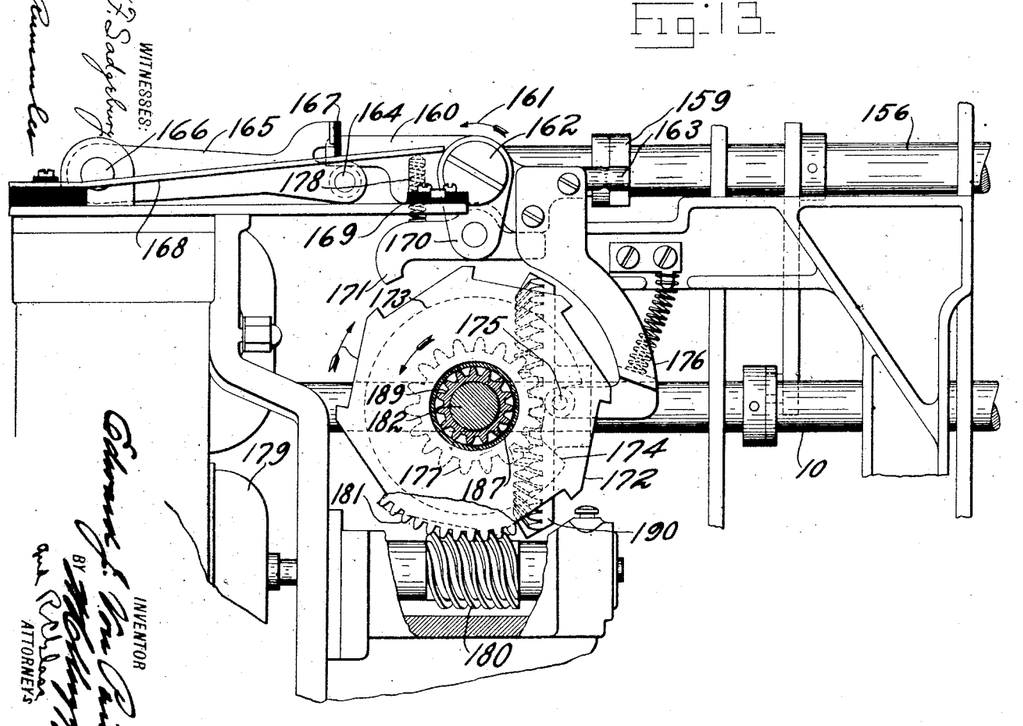
Fig. 13 is a detail in rear elevation showing the motor and its connection to the driving mechanism of the cash register.
Figure 14:
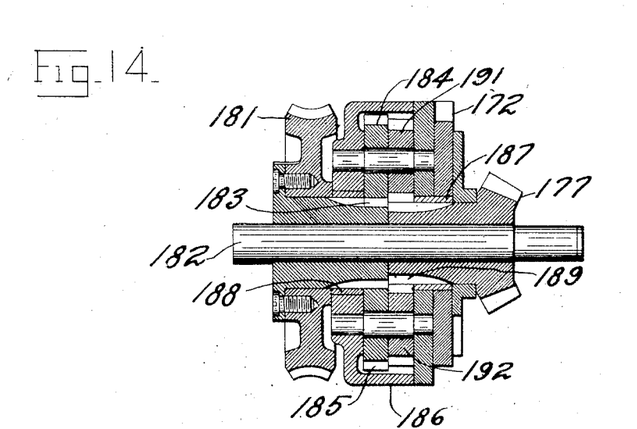
Fig. 14 is a vertical section of the planetary gear transmission device.
Figure 15:
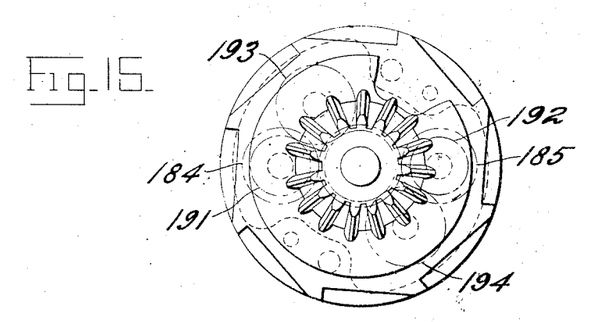
Fig. 15 is a front elevation of the device shown in Fig. 14.

*Motor controlling device and transmission mechanism.*—One bank of the keys 1 (Fig. 12) is slidably mounted in the guiding frame of the machine in a usual manner, that is, they are depressible against the action of returning springs and are provided with inclined lugs for co-acting with inclined lugs 141 of a segmental detent 142. The detent 142 is normally held in its lower position as shown in Fig. 12 by a spring 143 and when a key is depressed is moved upwardly during the initial movement of the key. The detent is provided with a roller 144 and a pin 145 respectively co-acting with extensions 146 and 147 of a lever 148 pivoted to the frame of the machine on a stud 149. A spring 150 normally urges the lever 148 into engagement with the pins 144 and 145 and when the segment 142 moves upward the lever 148 may rock around its pivot 149 so that a nose 151 of the same is moved into the path of an arm 152 fast on the drive shaft 10 consequently providing for the restoring of lever 148 by arm 152 at the end of the rotation of the shaft. The lever 148 also carries a stop pawl 153 normally in engagement with a square pin 154 on an arm 155 fast to a shaft 156. This shaft controls motor switch closing mechanism and the operation of a planetary gear transmission between the motor and drive shaft 10. A spring 157 normally urges shaft 156 to rock in the direction indicated by an arrow 158 and when the lever 148 is permitted to rock as described by the operation of detent 142, thus carrying the pawl away from pin 154, the spring 157 causes a rocking movement of shaft 156 thereby through an arm 159 (Fig. 13) fast on shaft 156 rocking an arm 160 in the direction indicated by arrow 161, as the arm 160, pivoted on a stud 162, carries a pin 163 extending across the upper edge of arm 159. The arm 160 may extend over a roller 164 pinned to a switch operating arm 165 and consequently when the arm 160 is rocked, cause the switch operating arm to be rocked downwardly around its pivot 166. The arm 165 may carry a block of insulating material 167 for engagement with spring contact members 168 so that the members 168 will be rocked into contact with fixed contact members 169 to which the motor terminal wires and the line wires are secured, thus closing the motor circuit. The arm 160 is rigid with an arm 170 on which is pivoted a spring pressed pawl 171 for co-acting with a brake or obstructing device such as a toothed member 172 which is part of the planetary gear transmission device. Rigidly secured to one of the transmission gears 177 is a disk 173 which is partly cut away at 174 and in which cut away part normally rests a roller 175 carried by an arm 176 secured to the arm 160. Consequently the transmission mechanism is prevented from operating and the machine is locked by the roller 175 until the pawl 171 is in engagement with the ratchet 172. The pawl 171 is allowed a certain independent rocking movement against the action of a spring 178 so that the arm 176 may be rocked well clear of the disk 173 before the rocking movement of the arm 160 is positively stopped by the pawl 171 engaging the brake or ratchet 172.

The motor armature is indicated by the numeral 179. Its shaft carries rigidly a worm 180 meshing with a worm wheel 181, loosely journaled on a short shaft 182 and rigid with a pinion 183 meshing with a pair of pinions 184 and 185 journaled in a drum shaped frame 186. This latter is rigidly secured to the ratchet 172 and is loosely journaled on sleeves 187 and 188 respectively surrounding part of the surface of pinions 189 and 183. The pinion 189 is integral with the bevel pinion 177 which meshes with a bevel gear 190 fast on drive shaft 10. Each pinion 184 and 185 is fast to a pinion 191 and 192, the latter meshing with intermediate pinions 193 and 194 also loosely journaled in the frame 186 and each meshing with the pinion 189. With the stop 171 in engagement with the ratchet 172 this planetary gear arrangement results in rotation of the worm wheel 181 being transmitted to the bevel gear 177 by the pinion 183 through pinions 184 and 185, 191 and 192, 193 and 194, to the pinion 189, which is rigid with the bevel gear 177. The pinions which communicate rotation from the pinion 183 to the pinion 189 are thus compelled to rotate around fixed centers rotating the bevel gear 177 and by means of it the drive shaft. However, if pawl 171 is withdrawn from engagement with ratchet 172 the casing 186 is free to revolve on its bearings and consequently continued operation of the motor would then result in the intermediate pinions 184, 191 and 193, and 185, 192 and 194 idly rolling around pinions 183 and 189. It will be readily understood that the reason for using the intermediate pinions 193, 194 is found in the direction of movement of main shaft 10 as compared with the motor. If either turned in the opposite direction these pinions would not be used.

The planetary gear arrangement is advantageous in that to stop the driving mechanism of the cash register without a sudden jar, without immediately stopping the motor, it is only necessary to withdraw the stop from the brake or ratchet at a certain time before the driving mechanism of the cash register reaches its home position, thus allowing the complete operation of the driving mechanism under its own momentum. The motor switch may be opened simultaneously with the disengagement of the stop from the ratchet, the motor being then free gradually to come to rest. The driving mechanism is positively stopped as soon as practicable after the disconnection of the motor and the driving mechanism and the opening of the motor switch. During the operation of the driving mechanism the disk 173, by co-acting with the roller 175, prevents withdrawal of the stop 171 permitting the stop to be withdrawn only when the cut away part of the disk arrives opposite the roller 175 when shaft 10 completes its single rotation. The return movement of arm 160, shaft 156 and arms carried thereby when permitted by the disk 173 is accomplished by a cam 200 on shaft 10 engaging a roller 201 carried by an arm 202 fast to the shaft 156. This movement of arm 160 also effects an opening of the motor circuit by permitting switches 168 to move out of contact with the contacts 169. The description of this mechanism has included a statement of the switch closing device but clearly the gear connection is of utility whether the circuit is also closed or not, and other means may be employed to close the circuit at each operation or the motor may be permitted to run continuously, so, too, other forms of motors may be employed not using electricity.

The form of brake or obstructing mechanism shown provides a positive stop for the planetary gear but obviously any device which will retard or stop the gear whether gradually or suddenly may be utilized and all such are considered to be within the scope of the invention.

*Operation.*—To enter a transaction in the machine the reel totalizer selecting lever 74 is adjusted to the desired position and the desired keys 1 are depressed. The adjustment of the lever 74 permits the indicator screens partly to cover the indicators and the depression of a key, by means of the mechanism shown in Figs. 12 and 13, effects the closing of the motor switch and movement of stop 171 into engagement with one of the teeth of ratchet 172. The motor then, through the planetary gear transmission, causes the rotation of the main drive shaft 10. At the beginning of rotation of shaft 10 the cam 112 (Fig. 9) passes clear of roller 113 thus permitting the spring 111 to rock arm 105 forwardly unlocking and forcing the cash drawer to its open position. Shaft 11 (Fig. 3) is first rocked counter clockwise causing an arm carried thereby to restore all of the segments 4 which had been moved out of zero position on the previous operation of the machine. Then on the return of shaft 11 segments 4 are carried upwardly by the segments 3 fixed to the shaft 11 distances as controlled by the depressed keys which serve to unlatch the segments 3 from the segment gears 4 when the segment gears 4 have moved the desired distances. The movement of the segment gears 4 is communicated to the indicators through the intermediate gears 5 but before the indicators start to rotate cam 41 (Fig. 6) by operating on pitman 38 moves the indicator screens to full screening position.

If the shillings indicator makes one rotation or more the cut away surface 46 of plate 44 (Fig. 4) comes opposite the roller 47 on arm 49 permitting the arm to rock downwardly away from shoulder 52 of the disk which is rigid with the tens of shillings indicator, permitting this disk to rotate far enough to set the tens of shillings characters 31, the shoulder 57 of the disk, by engagement with the shoulder 51 of arm 49, serving to stop the indicator in the proper position. The check strip is fed forward to printing position and the platen 119 is operated, printing the check and severing the same from the remainder of the strip. Cam 128 serves to rock the check gripping device 122 into position to receive the check from the printing mechanism after which the cut away part of the cam arrives opposite the roller, the arm 123 permitting the spring 125 to return the check delivering device to normal position with the check extending outwardly and upwardly in convenient position to be taken by the operator. Toward the end of the operation the cam 41 (Fig. 2) returns the indicator screen mechanism to normal position, thereby exposing the amount of the entry at the indicator sight openings.

While the form of mechanism herein shown and described is admirably adapted to fulfil the objects primarily stated it is to be understood that it is not intended to confine the invention to the one form of embodiment herein shown and described as it is susceptible of embodiment in various forms all coming within the scope of the claims which follow.

What is claimed is:

1. In a machine of the class described, the combination with indicators of higher and lower value, of means for differentially positioning said lower value indicator, a device normally latching the higher value indicator and controlled by the lower value indicator, and means for moving the higher value indicator an extent determined by said latching device.

2. In a machine of the class described, the combination with indicators of higher and lower value, of key controlled means for differentially positioning said lower value indicator, an arm controlled by said lower value indicator and normally latching said higher value indicator, and means for moving said higher value indicator when said latching arm is withdrawn.

3. In a machine of the class described, the combination with indicators of higher and lower value, and key controlled connections for differentially positioning said lower value indicator, of an arm normally latching said higher value indicator, connections whereby said latching arm may be released by a movement of predetermined extent of said lower value indicator, and means for moving said higher value indicator when the same has been released.

4. In a machine of the class described, the combination with indicators of higher and lower value, and means for differentially positioning said lower value indicator, of an element rotatable with said lower value indicator and having portions of differing radii, an arm normally latching said higher value indicator, and positioned to rest on said rotatable element, and a spring for moving said higher value element when the latching arm has released the same.

5. In a machine of the class described, the combination with indicators for units and tens, of a bank of keys therein, means controlled by said keys for differentially positioning said units indicator, an element movable with said positioning means and having portions of differing magnitude, a device normally latching said tens indicator and positioned to engage both portions of said element, and a spring for moving said tens indicator when the same is released from said latching device.

6. In a machine of the class described, the combination with an indicator, of means for differentially setting the indicator, a second indicator, means controlled by said first mentioned indicator for setting said second indicator when said first indicator has moved a predetermined extent, indicator screen mechanism, and means controlled by the indicator screen mechanism for returning said second indicator to normal position.

7. In a machine of the class described, the combination with indicators of higher and lower value, and means for differentially positioning said lower value indicator, devices, controlled by said lower value indicator, for moving said higher value indicator, a screen for both said indicators, and connections whereby said screen may reset said higher value indicator to normal position.

8. In a machine of the class described, the combination with indicators of higher and lower value, of means for differentially positioning said lower value indicator, an arm normally latching said higher value indicator against movement, connections from said lower value indicator controlling release of said latching arm, a spring for moving said higher value indicator, an indicator screen, and connections from said screen for withdrawing said higher value indicator from indicating position and thereby tensioning said spring.

9. In a machine of the class described, the combination with indicators of higher and lower value, of key controlled means for differentially positioning said lower value indicator, an indicator screen, and means for moving it, connections whereby said screen may restore said higher value indicator to concealed position, an arm normally latching said higher value indicator and controlled by said lower value indicator, and a spring connected to cause said higher value indicator to follow said screen when said latching arm has been released.

10. In a machine of the class described, the combination with indicator mechanism, of means for setting the same, an indicator screen, a manipulative device for controlling the setting means, connections controlled by said manipulative device to move the screen partly to screening position, and means independent of said manipulative device for thereafter moving the screen to its full screening position.

11. In a machine of the class described, the combination with movable parts, of a screen for concealing said parts, a manipulative device, connections controlled by said manipulative device permitting said screen to move to a position partially concealing said movable parts, an operating mechanism for said movable parts, and connections from said operating mechanism to move said screen first, to a position completely concealing said movable parts and, thereafter back to exhibiting position.

12. In a machine of the class described, the combination with an indicator and a screen therefor, of a main operating mechanism, connections from said operating mechanism to said screen including a latching arm having two projections and a flange normally engaging one of said projections, a manipulative device and connections therefrom to displace said latching arm, and a spring constructed to move said screen until the other of said projections engages said latching arm.

13. In a machine of the class described, the combination with an accounting mechanism, of driving mechanism therefor, a cash drawer, a pivoted lever for engaging the cash drawer, a spring for actuating the lever, means for tensioning said spring by the operation of the driving mechanism and thereafter permitting the said spring to operate said lever.

14. In a machine of the class described, having movable parts, the combination with a main driving gear, and a motor actuating the same, of positive gear connections from said driving gear to said movable parts, means for obstructing one element of said connections, and keys controlling said obstructing means.

15. In a machine of the class described, the combination with means for issuing a check, of a check delivering device comprising, a pivoted arm with means for oscillating it, a check gripping device pivoted on said arm and including clips spring drawn together; stationary pins on which said gripping device rides, whereby to rotate the same, and a spring connected to restore said pivoted arm.

16. In a machine of the class described, the combination with indicators of higher and lower value, the lower value indicator having thereon a single set of digits from 0 to 9 inclusive and the higher value indicator having the digit 1 thereon, means for rotating the lower value indicator once or twice during a single operation of the machine to display any desired digit thereon, and means controlled by the lower value indicator for displaying the digit 1 of the higher value indicator during the second rotation of said lower value indicator.

17. In a machine of the class described, the combination with a units indicator having thereon a single set of digits from 0 to 9 inclusive; of a tens indicator having thereon the digit 1, means for rotating the units indicator once or twice during a single operation of the machine for the purpose of displaying the digits thereon, and means for rotating the tens indicator to display the digit 1 thereon during the second rotation of the units indicator.

18. In a machine of the class described, the combination with an indicator of lower value having thereon a single set of digits from 0 to 9 inclusive, of an indicator of higher value having thereon the digit 1, means for rotating the indicator of lower value once or twice during a single operation of the machine for the purpose of displaying the digits thereon, a spring for rotating the indicator of higher value to display the digit 1 thereon, means normally locking the latter indicator, and means controlling said locking means during the second rotation of the indicator of lower value.

19. In a machine of the class described, the combination with a movable indicator having a character thereon, means for moving said indicator for the purpose of displaying said character, a concealing means for the indicator, mechanism controlled by the concealing means for preventing movement of the indicator to display its character until the concealing means is withdrawn, and means for withdrawing said concealing means.

20. In a machine of the class described, the combination with an indicator having suitable indicia thereon, of means for moving said indicator for the purpose of displaying the indicia, and concealing means for the indicator controlling the movement of said indicator.

21. In a machine of the class described, the combination with an indicator having suitable indicia thereon, of a spring for moving the indicator for the purpose of displaying the indicia, and an oscillatory member so constructed that when moving in one direction it will withdraw the indicator from displaying position and when moving in the opposite direction will permit the spring to move the indicator into displaying position.

22. In a machine of the class described, the combination with indicating mechanism, of concealing means therefor, means for partially operating the concealing means for the purpose of indicating that the operation of the machine is incomplete, and an operating mechanism for permitting further operation of the concealing means and then positively withdrawing said concealing means from the indicating mechanism thereby indicating the complete operation of the machine.

23. In a machine of the class described, the combination with indicating mechanism, of concealing means therefor, a spring for moving the concealing means to a partially operated position for the purpose of indicating that the operation of the machine is incomplete, and an operating mechanism so constructed as to permit a further movement of the concealing means by its spring and then positively withdrawing said concealing means for the purpose of indicating the complete operation of the machine.

In testimony whereof I affix my signature in the presence of two witnesses.

EDWARD J. VON PEIN.

Witnesses:
WARD E. CROMER,
R. C. GLASS.